United States Patent
Chamberlain et al.

(10) Patent No.: US 7,730,461 B2
(45) Date of Patent: Jun. 1, 2010

(54) SOFTWARE TOOL CONFIGURED TO GENERATE TEST CASES CHARACTERIZED BY A LINEAR RANGE OF INTEGRAL VALUES

(75) Inventors: John T. Chamberlain, Medford, MA (US); Joann Jordan, North Reading, MA (US)

(73) Assignee: International Business Machines Corporation, Armonk, NY (US)

(*) Notice: Subject to any disclaimer, the term of this patent is extended or adjusted under 35 U.S.C. 154(b) by 1711 days.

(21) Appl. No.: 10/738,814

(22) Filed: Dec. 17, 2003

(65) Prior Publication Data

US 2004/0133881 A1     Jul. 8, 2004

Related U.S. Application Data

(63) Continuation-in-part of application No. 10/331,388, filed on Dec. 30, 2002, now Pat. No. 7,124,402.

(51) Int. Cl.
    *G06F 9/44*     (2006.01)
(52) U.S. Cl. ........................ 717/135; 717/125
(58) Field of Classification Search .............. 717/125, 717/135
    See application file for complete search history.

(56) References Cited

U.S. PATENT DOCUMENTS 5,790,117 A  *  8/1998  Halviatti et al. ............. 715/744
6,002,869 A  *  12/1999 Hinckley ..................... 717/124
6,944,848 B2 *  9/2005  Hartman et al. ............. 717/124

* cited by examiner

*Primary Examiner*—Wei Y Zhen
*Assistant Examiner*—Phillip H Nguyen
(74) *Attorney, Agent, or Firm*—Daniel McLoughlin, Esq.; Steven M. Greenberg, Esq.; Carey, Rodriguez, Greenberg & Paul, LLP (57) ABSTRACT

The present invention is a system for efficiently generating test cases characterized by a linear range of integral values. A software testing tool which has been configured to generate test cases characterized by a linear range of integral values in accordance with the present invention can include a user interface coupled to a test case generator. The test case generator can be configured for range bounding for a range of integral values in a software application under test. In particular, the test case generator can include a halving module programmed to identify changes in response states in the software application under test evoked from input tokens having selected ones of the lengths defined within sub-ranges of a specified range of integral values.

13 Claims, 6 Drawing Sheets

SOFTWARE TOOL CONFIGURED TO GENERATE TEST CASES CHARACTERIZED BY A LINEAR RANGE OF INTEGRAL VALUES

CROSS REFERENCE TO RELATED APPLICATIONS

This patent application is a continuation-in-part of U.S. patent application Ser. No. 10/331,388 entitled TESTING SOFTWARE MODULE RESPONSIVENESS TO STRING INPUT TOKENS HAVING LENGTHS WHICH SPAN A RANGE OF INTEGRAL VALUES filed on Dec. 30, 2002 now U.S. Pat. No.7,124,402, the contents of which are incorporated herein by reference.

BACKGROUND OF THE INVENTION

1. Statement of the Technical Field

The present invention relates to the field of software testing and more particularly to testing the handling of tokens of various lengths in software code.

2. Description of the Related Art

Software modules which process Internet protocols including the hypertext transfer protocol (HTTP), the lightweight directory access protocol (LDAP), the simple mail transport protocol (SMTP), the post office protocol version three (POP3) and so forth, typically perform a significant amount of parsing of character and numeric strings, and accordingly, include a proportionate segment of source code dedicated to the same. Most Internet protocols, however, do not constrain the length of tokens involved in processing input data according to the respective protocols. Therefore, code which has been designed to process Internet protocol data must be prepared to handle input tokens of arbitrary lengths.

Yet, software engineers charged with the development of software modules intended to process Internet protocols often code to a "mental model" of what is to be considered a reasonable length of an input token. Consequently, software engineers may neglect to design such code to properly handle unusually long, unusually short, or missing input tokens. This problem can be exacerbated by the fact that a given token can be parsed or otherwise processed in many different layers of code within a software module. In this regard, each layer or combination of layers could have been developed by different software engineers.

Preferably, the testing process for such a software module ought to locate all code paths within the module which cannot gracefully handle unexpected input token lengths. In that regard, generally, the software module ought to be tested by varying the length of each individual input token that can be included in input data from zero to a desired upper bound. Yet, as any one given token can be processed by multiple code paths in different layers of a software module, it can be extremely difficult for the tester of the module to identify all particular token lengths which will cause the software module to return different responses to the input data. In particular, where the developer of one layer has a competing view of "reasonably sized token" with the view of another developer of another layer in the software module, unexpected results can occur.

As an example, one code path in a software module can correctly handle a token having a length which ranges from one (1) to five-hundred and twelve (512). Yet, the code path can crash for any other length, including zero (0). In another code path within the same module, however, a minimum length of ten (10) and a maximum length of sixty-four kilobytes (65,535) may be acceptable. Consequently, it would not be appropriate to test the software module using only a few, randomly selected lengths for input tokens. To do so would compromise the ability of the test to detect points of failure in particular code paths. Notwithstanding, the cost of testing every possible input token length from zero (0) to sixty-four kilobytes can prove too unwieldy or costly to be practical.

Improper handling of particular token lengths in a code path within a software module can cause the software module to crash or otherwise to fail in an ungraceful manner. In addition, faulty code paths can be vulnerable to buffer-overflow attacks and other forms of abuse by malicious agents. Buffer-overflow attacks have become a daily occurrence in the corporate information technology arena and have become a significant source of embarrassment and financial liability for software companies. Accordingly, there remains a long-felt, unsolved need for a software testing system and method in which faulty token-processing code paths can be efficiently identified within the time and resource constraints common to the software industry.

SUMMARY OF THE INVENTION

The present invention addresses the deficiencies of the art in respect to software testing and provides a novel and non-obvious system for efficiently generating test cases characterized by a linear range of integral values. A software testing tool which has been configured to generate test cases characterized by a linear range of integral values in accordance with the present invention can include a user interface coupled to a test case generator. The test case generator can be configured for range bounding for a range of integral values in a software application under test. In particular, the test case generator can include a halving module programmed to identify changes in response states in the software application under test evoked from input tokens having selected ones of the lengths defined within sub-ranges of a specified range of integral values.

In a preferred aspect of the invention, the user interface can include at least one of an automatic or a manual mode oriented user interface. Each can be configured to accept a specification of a range of integral values to be tested, and further each can be configured to render results of the range bounding in graphical form. The graphical form can include at least one of a stacked bar chart or a multi-axis chart. In this regard, the graphical form can include a multiplicity of dynamically changeable graphical renderings of sub-ranges for each state produced by the range bounding. The graphical form further can include an activatable element disposed within the graphical form for matching a result in a sub-range produced through the range bounding to an existing state rendered in the graphical form. Also, the graphical form can include a dialog for configuring and rendering a new state in the graphical form for a result in a sub-range produced through the range bounding.

The software testing tool can include an application programming interface (API) to the test case generator. The API can expose methods for configuring individual test ranges of integral values, for executing the range bounding for the individual test ranges, and for reporting results of the range bounding. The software testing tool also can include an import/export facility configured both to export results from the range bounding in the test case generator to a portable format, and also to import into the test case generator persisted results from a previous instance of range bounding. Optionally, the import/export facility can include a comparator programmed to compare results from the range bounding to persisted results from previous instances of range bounding. Also, the import/export facility can optionally include conditional notification logic for notifying external entities of results from the range bounding.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a software tool configured to generate a minimal set of test cases characterized by a linear range of integral values. The software tool can include a test case generator programmed to test code paths in software under test, wherein the code paths are sensitive to the lengths of tokens in the input data sent to the software under test, and the object of the testing is to determine the response of the code paths to tokens of different lengths. Importantly, a user interface to the test case generator can be provided through which the test case generator can be manually or automatically operated, and further through which the results of the testing can be both textually and graphically rendered.

Notably, the test case generator can produce a minimal set of test cases for testing the code paths of the software under test. To that end, a range bounding process disposed within the test case generator can efficiently discover the varying responses of the code paths to different token lengths, and for each response state so discovered, the process can efficiently determine the range of token lengths which will trigger that state. Based upon the results of the range bounding process, a list of token lengths which define the boundaries of the discovered response states can be written to a production test script for testing the software, as an alternative to testing all possible input token lengths across the full range of possible lengths.

An API further can be provided to the test case generator so as to permit programmatic operation of the test case generator by other applications. Finally, an import/export facility can be included along with the system. The import/export facility can allow the software tool to persist the results of a testing session for later playback by the software tool, or for use by another application. Further, aspects of the present invention will be apparent to the skilled artisan through the following detailed description of the preferred embodiments.

Figure 1:
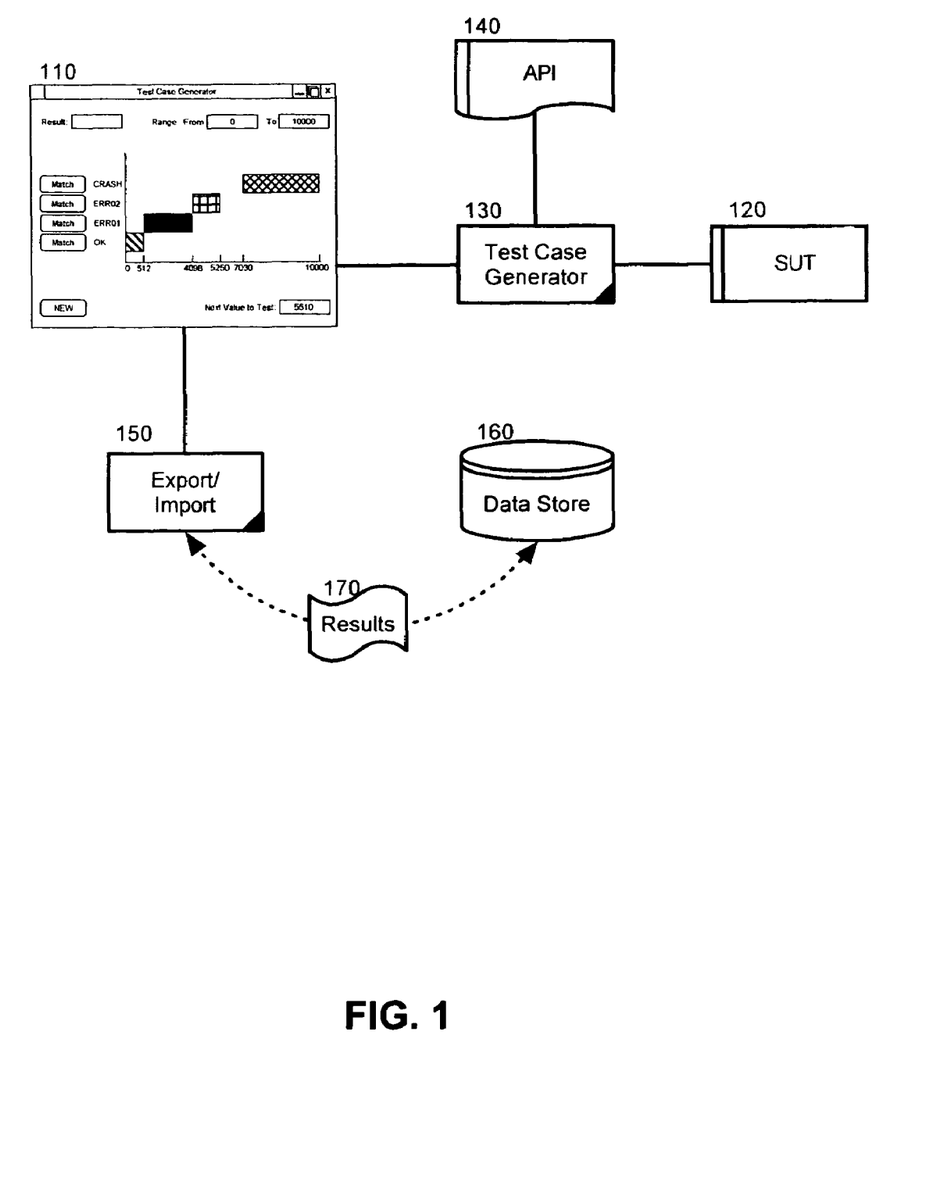
FIG. 1 is a schematic illustration of a software tool configured to generate test cases characterized by a linear range of integral values.

FIG. 1 is a schematic illustration of a software tool configured to generate test cases characterized by a linear range of integral values through the operation of a user interface to the software tool. The software tool can include a user interface 110 coupled to a test case generator 130. The test case generator 130 can be configured for communicative linkage to one or more software applications 120. When linked to the test case generator 130, each of the software applications 120 can be referred to as. "software under test".

The user interface 110 can provide interactive elements through which an end user can manually operate the test case generator 130. The manual operation of the test case generator 130 can include the specification of a range of test values, a new value to be tested, and elements sufficient to identify and label results of a tested value in a visual graphing of the tested range. To that end, the user interface 110 further can include graphics rendering logic for rendering a graphical image of the results of the tested values in the specified range of test values. Importantly, the user interface 110 alternatively can be configured for the automated operation of the test case generator 130 in which case the interface elements disposed within the user interface 110 can be essentially (albeit not completely) limited to those feedback elements necessary for the automated operation of the test case generator 130.

An API 140 can be defined and coupled to the test case generator 130. The API 140 can expose an interface to the core operation of the test case generator 130. Specifically, the API 140 can expose an interface to establishing a range of tested values, for initiating the testing process, for testing a specific test case value, and for retrieving the results of the tested range of integral values, to name a few. Moreover, the API 140 can expose an interface for comparing the results of two tests to determine whether the results are equivalent. In this regard, to the extent that the results of two tests do not match identically, but match contextually, algorithms or expressions (such as pattern-matching regular expressions) can be specified by the end user to determine when two entries in the test results are to be considered to match. In any case, the API 140 further can be configured for coupling to an external application so that the test case generator 130 can be remotely and programmatically operated by one or more external applications.

Finally, an import/export facility 150 can be coupled both to the user interface 110 and also to a data store 160. The import/export facility 150 can be configured to persist the results 170 of a test of a range of tested integral values in the data store 160. The import/export facility 150 further can be configured to retrieve persisted ones of the results 170 from the data store 160, for rendering in the user interface 110, or to enable the test case generator 130 to compare the results of an older, persisted test to a new test to ensure that the behavior of the software under test 120 has not changed.

Finally, the import/export facility 150 can export the results 170 of a test of a range of tested integral values to an exportable format such as a plain text file of comma or tab separated values, a flat binary file, or a markup language formatted document, though the invention is not limited to any particular export format. The results 170 can be forwarded in the exported format to interested external entities unconditionally, or based upon the satisfaction of a pre-condition, such as when a crash has been detected. In particular, the results can be communicated to interested entities external to the software testing tool by way of e-mail or other messaging to an administrator.

Figure 2:
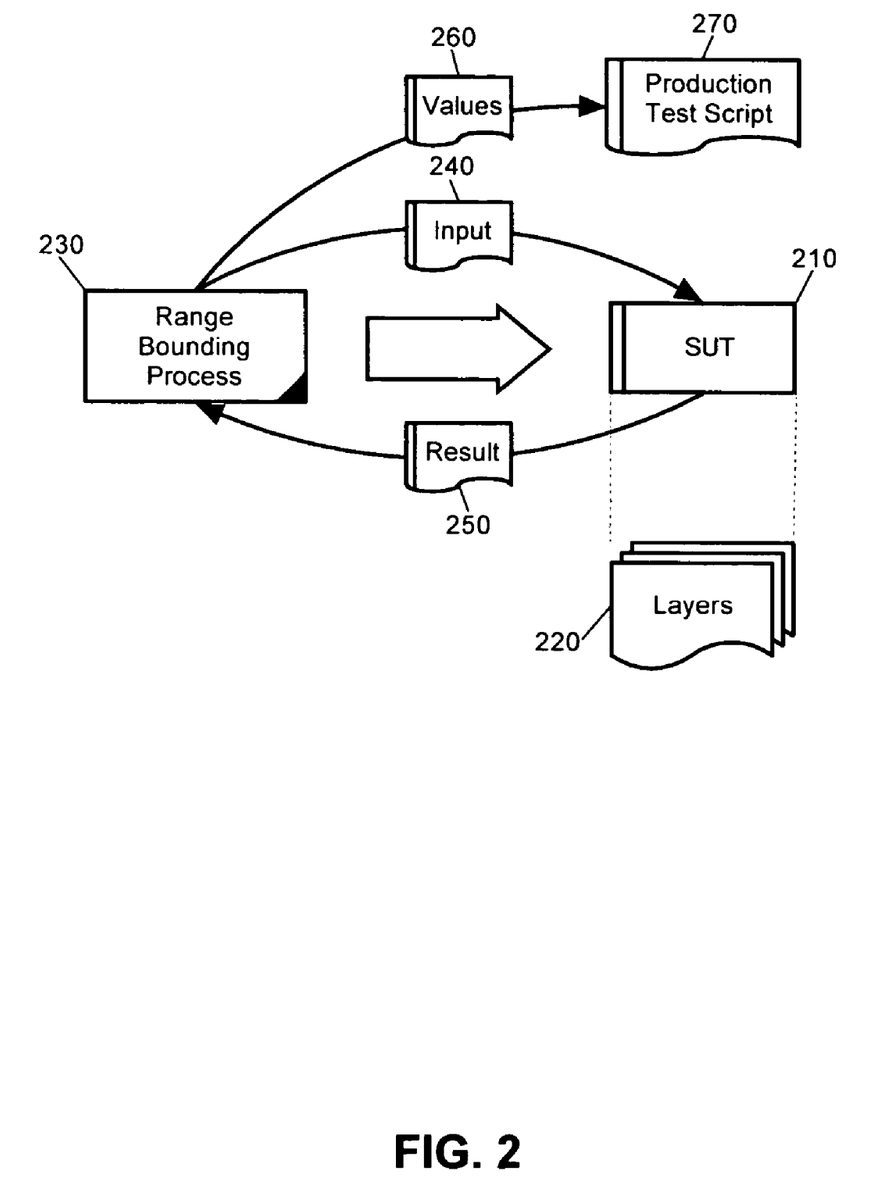
FIG. 2 is a schematic illustration of the test case generator of FIG. 1 disposed within a software testing system configured to test code paths within one or more layers of a software under test to ensure the proper handling of input tokens across a range of possible token lengths.

Central to the software tool of FIG. 1 is the software testing system anchored by the test case generator 130. In more particular illustration, FIG. 2 is a schematic illustration of a software testing system configured to test code paths within one or more layers of a software module to ensure the proper handling of input tokens across a range of possible lengths. The software testing system can include a software module 210 formed of one or more programmatic layers 220. The software module 210 can implement one or more Internet protocols such as HTTP, LDAP, SMTP, POP3, and the like. Accordingly, the software module 210 can accept as input 240, input tokens including one or more character or numerical tokens. Based upon the received input 240, the software module 210 can produce a result 250 which can range from a programmatic result produced in accordance with the planned operation of the software module 210, to a error condition produced in consequence of an improperly handled token length.

Ordinarily, to test the ability of the software module 210 to handle varying input token lengths at each layer 220 of the software module 210, a software testing system would probe the software module 210 with input tokens having incrementally larger and larger lengths in order to detect the responses produced by the software module 210 at each layer 220. Yet, an incremental search of this nature can be wasteful when testing a wide range of lengths. Accordingly, in accordance with the inventive arrangements, the range bounding process 230 can detect sub-ranges of lengths within the continuum of input token lengths, wherein each sub-range defines a range of lengths which cause an equivalent response from one or more of the layers 220.

For example, in one exemplary module, a name token may be required. As is usual with public Internet specifications, the permissible lengths of the name token may not be explicitly constrained by the Internet specification which the module implements. In such a case, it remains the responsibility of the authors of the software module to determine a range of lengths deemed acceptable for the token in the context of its usage in the module, and to anticipate and properly respond to tokens whose lengths fall outside of the acceptable range. As noted, however, this responsibility is often complicated by the fact that a typical software module is comprised of layers of code, which may be designed or written by different authors who have imperfect or contradictory understandings of the acceptable token length, or who simply fail to adequately safeguard against lengths falling outside of the acceptable range.

Accordingly, in the exemplary module, a name token having zero length would cause an error condition at the top-most layer of the module in as much as a name token will be required as a parameter to the protocol request. Also, any name token which exceeds 1,024 will be considered an invalid input token by the top-most layer. In the second layer of code which parses the token, a name token having a length which ranges from five-hundred and thirteen (513) to one-thousand and twenty-four (1,024) may overwrite an array causing an outright crash of the software module. In the third layer of code, where a directory look-up function can be executed based upon the name token, a token having a length greater than two-hundred and fifty-seven (257) may be considered by that layer to be a name whose length exceeds the maximum permissible length in the directory.

In this exemplary module, response states will change when the name token length increases from 0 to 1, 256 to 257, 512 to 513, and from 1024 to 1025. The response can range from a successful result to a system crash. Another way of categorizing this behavior is to observe that the integral ranges 0-0 (rejected by top layer), 1-256 (success), 257-512 (rejected by third layer), 513-1024 (crashes second layer), and 1025 upwards (rejected by top layer) each represent a sub-range for a particular response state, wherein the response state is equivalent for any value within its sub-range, inclusive of its boundary values. In a conventional software testing system, discovering the response states would typically be performed by trying all possible lengths in order, from zero to some specified maximum.

One skilled in the art would find it obvious that such an approach is inefficient. For instance, once the 512-513 transition point has been discovered, testing the lengths 514, 515, and so on will continue to yield the same response state until the 1024-1025 transition is reached. Consequently, the system and method of the present invention can provide a significantly more efficient mechanism for discovering the response state boundaries.

Through the utilization of a divide and conquer methodology, the bounding process 230 of the present invention can efficiently identify the response state sub-ranges ranges to produce a list of boundary values 260. Further, based upon the boundary values 260, the production test script 270 can test only the sub-range boundaries to verify the behavior of the target module, for example from one version of the target module to the next. Lengths intermediate to boundary lengths can be ignored, thereby gaining a far more efficient use of testing resources. Should the production test script discover that the target module behavior has changed in a new version of the module, then the process can be re-executed to determine the new set of boundary values.

Figure 3:
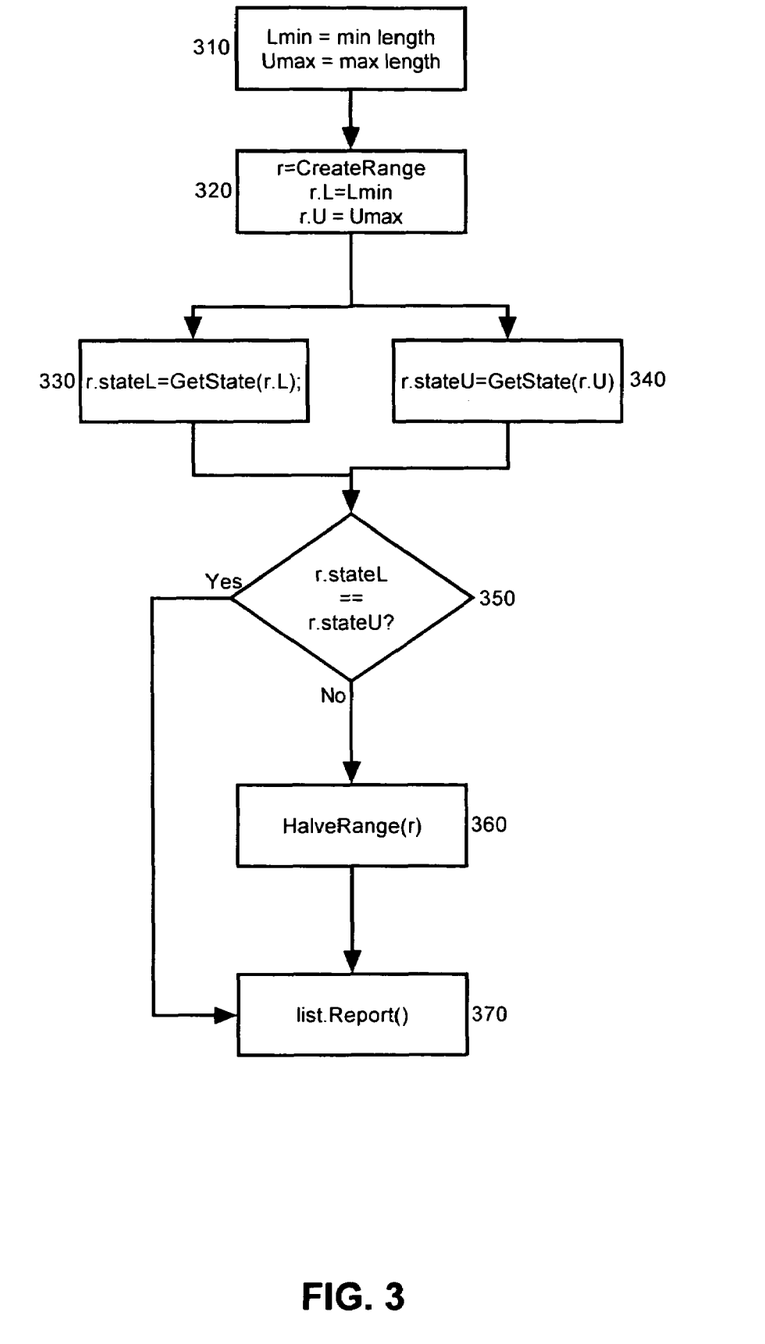
FIG. 3 is a flow chart illustrating a process of identifying response state boundaries for input token lengths in the software under test of FIG. 2.

FIG. 3 is a flow chart illustrating a process of identifying token length processing boundaries in the software module 210 of FIG. 2. As will be recognized by one skilled in the art, the process of identifying token length processing boundaries across multiple code paths in a software module can be applied within a testing apparatus which can repeatedly call the target module with a template input line having a placeholder for the token under study. At the outset, in block 310 a maximum and minimum length can be specified for the outer limits of input token lengths that should be tested. The maximum and minimum lengths act as constraints on the overall operation of the invention, and would normally be chosen so that they are at or beyond the range of lengths that would be expected to produce the full set of target module response states. To begin the process, in block 320, the initial range r can be created with its lower bound equal to the specified minimum length and its upper bound equal to the specified maximum length, and the responsive state of the target module can be obtained in blocks 330 and 340 for both the lower and upper bounds of the range, respectively.

In decision block 350, if it is determined that the response state at the upper bound of the range is equivalent to the state at the lower bound of the range, the range halving process of block 360 can be bypassed as it appears there will be no response state boundaries to detect, and the process can proceed directly to block 370. In block 370, a report of all the response state boundaries found can be printed or written to storage. In the case where one arrives at block 370 from block 350, the list will be empty as both the lower and upper bounds of the range evoked the same response state.

Figure 4:
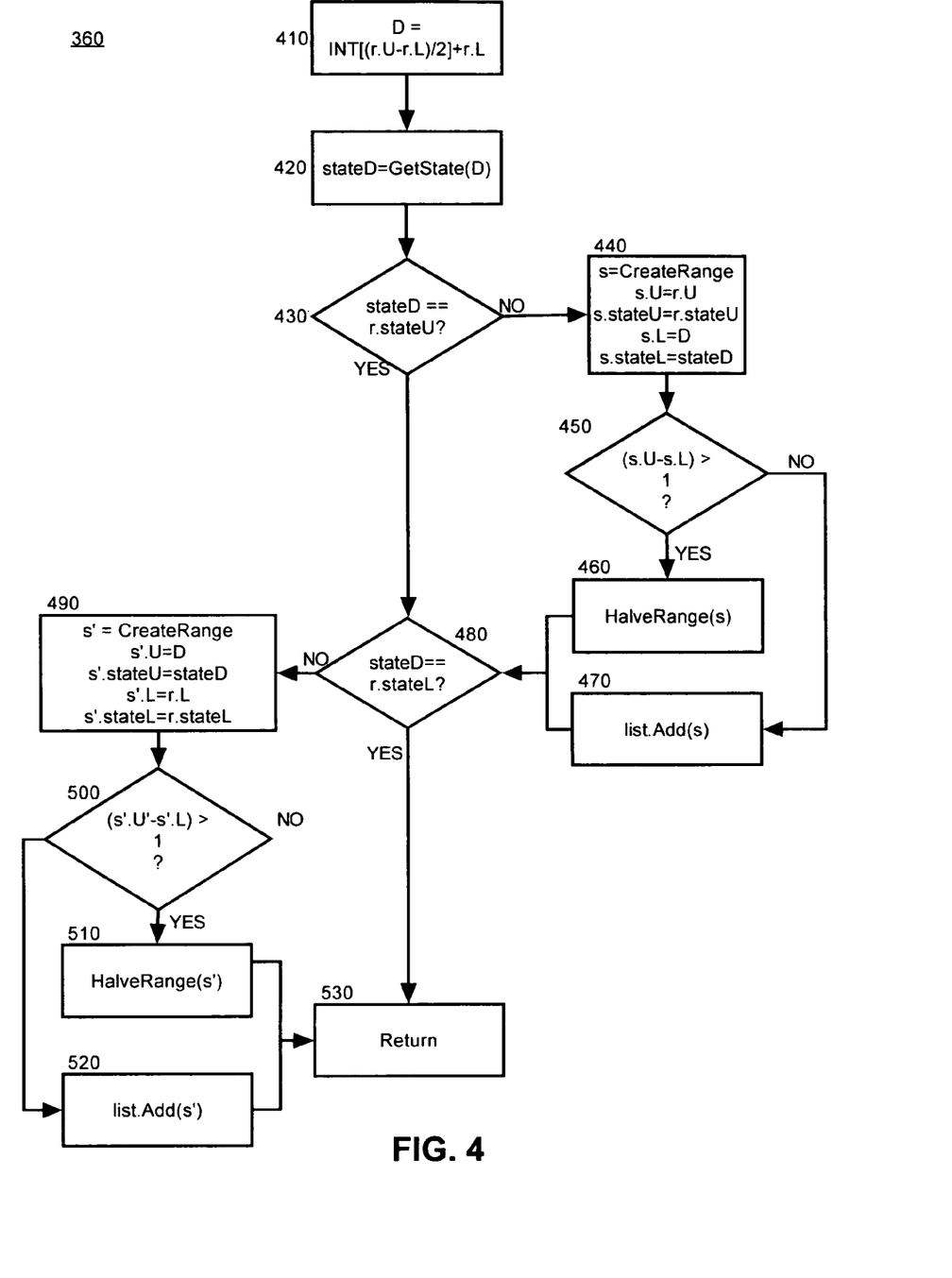
FIG. 4 is a flow chart illustrating a halving methodology for use in the process of FIG. 2.

If, however, in decision block 350 it is determined that the state at the upper bound of the range r is not equivalent to the state at the lower bound of the range, it can be presumed that at least one state boundary exists in the continuum of the range. Accordingly, in block 360, a halving process can be applied to the range r, subdividing it into at least two sub-ranges. Each of the sub-ranges can be searched individually in a recursive manner for response state boundaries as shown in FIG. 4. Upon return from the halving process in block 360, the invention can report in block 370 a list of all of the response state boundaries detected, which list can be used as input to a production test script as mentioned above. Importantly, though in the preferred aspect of the present invention a halving algorithm can be applied in which two sub-ranges are produced by subdividing the range into two ranges of equal or nearly equal size, the invention is not to limited to the number or nature of divisions applied to search the entire range for state boundaries.

In any event, in the preferred aspect of the present invention, a halving process can be applied to the range, and the halving process can be applied to the sub-ranges so produced recursively until it is determined that there are no more response states to be detected. To that end, FIG. 4 is a flow chart illustrating a recursive halving mechanism for use in block 360 of the process of FIG. 3. In a preferred albeit non-exclusive aspect of the present invention, the halving methodology can be recursively implemented so as to progressively divide the range into smaller and smaller sub-ranges until it can be inferred that no state boundary exists between a chosen lower and upper bound of a sub-portion of the range. Specifically, in block 410, for a selected range with lower bound r.L and an upper bound r.U, an intermediate bound D can be computed in between the lower and upper bounds according to the equation $D=int((r.U-r.L)/2)+r.L$. At the bound D, the target module response state can be ascertained in block 420 by sending the target module an input string token having a length D and storing the response as stateD.

In decision block 430, it can be determined whether stateD is equivalent to the state at the upper bound—namely, r.stateU. If both states are equivalent, it can be presumed that no boundary changes in state will occur in the continuum between D and r.U. Accordingly, the continuum bounded by D and r.U is not further considered and the process can proceed directly to considering the lower portion of the range r in block 480. If however in block 430 it is determined that stateD differs from r.stateU, then a new sub-range s is created in block 440 whose upper bound s.U and upper bound state s.stateU are set equal to the upper bound r.U and upper bound state r.stateU of the range r respectively, and whose lower bound s.L and lower bound state s.stateL are set equal to D and stateD respectively. In decision block 450 it can be determined whether the upper bond s.U and lower bound s.L are adjacent values, that is, the span of the subrange s is no greater than one and there do not exist any integral values between the bounds. If s.U and s.L are determined to be adjacent values, then because they are associated with different states, it can be presumed that s.U and s.L represent the two sides of a response state boundary. Accordingly, in block 470 the said state boundary can be inserted into the list of discovered boundaries, and the process continue with the investigation with the lower half of the range r in block 480.

By comparison, if in decision block 450 s.U and s.L are determined not to be adjacent values, it can be presumed that a state boundary lies somewhere within the sub-range s. Consequently, in block 460 the halving process can be called recursively for sub-range s. It will be understood by the skilled artisan that upon completing the recursively called halving process 460, the process can continue to decision block 480 with the knowledge that all response state boundaries lying within the sub-range s will have been detected and inserted into the list of discovered response state boundaries.

In blocks 480 through 520, the sub-range defined by the lower bound r.L and the intermediate bound D can be inspected for state boundaries in equivalent manner to the process described for blocks 430 through 470. Specifically, in decision block 480 it can be determined whether the state at D is equivalent to the state at the lower bound of range r—namely, r.stateL. If so, it can be presumed that no state boundaries will occur in the continuum between D and r.L. Accordingly, the continuum bounded by D and r.L is not further considered and the process can return to the caller in block 530 as both of the divisions of the range r, one division bounded by D through r.U, and the other division bounded by D through r.L, have been processed.

If, however, in block 480 it is determined that stateD differs from r.stateL, then a new subrange s' is created in block 490 whose upper bound s'.U and upper bound state s'.stateU are set equal to D and stateD respectively, and whose lower bound s'.L and lower bound state s'.stateL are set equal to the lower bound r.L and lower bound state r.stateL of the range r respectively. In decision block 500 it can be determined whether the upper s'.U and lower bound s'.L are adjacent values, that is, the span of the sub-range s' is no greater than one and there do not exist any integral values between the bounds. If s'.U and s'.L are determined to be adjacent values, then because they are associated with different states, it can be presumed that s'.U and s'.L represent the two sides of a response state boundary. Accordingly, in block 520 the state boundary can be inserted into the list of discovered boundaries, and the process return to the caller in block 530, as both divisions of the range r have been processed.

By comparison, if in decision block 500 s'.U and s'.L are determined not to be adjacent values, it can be presumed that a state boundary lies somewhere within the sub-range s'. Consequently, in block 510 the halving process can be called recursively for sub-range s'. It will be understood by the skilled artisan that upon completing the recursively called halving process 510, the process can continue to block 430 with the knowledge that all boundaries lying within the sub-range s' will have been detected and inserted into the list of discovered boundaries.

It will be apparent to the skilled artisan that certain modifications can be made to the foregoing process without materially affecting the principle of the operation of the invention. For instance, whereas in the foregoing description the invention processes sub-ranges to the high-side of intermediate bounds before processing sub-ranges on the low-side, an implementation could equally well give preference to low-side sub-ranges. Also, variations in the generation of sub-ranges are possible. Ranges could be divided into sub-ranges on a different basis than the halving module described herein; for example by dividing into non-equal portions or more than two portions. Also, the division of a range into sub-ranges about an intermediate bound could occur before determining the state of the intermediate bound, rather than after determining the state of the intermediate bound, which is the optimized implementation in the preferred embodiment.

Also, sub-ranges and the list of discovered boundaries could each be implemented in software in a variety of ways, for example as an array of elements, a linked list of objects, or other common data structures; or each could be implemented in hardware as electronic or mechanical devices. Also, variations in the reporting or writing to storage of the detected response state boundaries are possible, for example, whereas in the preferred embodiment described herein the boundaries are reported as a list of adjacent value pairs, each pair representing the two sides of a state boundary, the result could also be reported as a list of sub-ranges defined by upper and lower bounds, each sub-range representing a continuum over which the response state is identical.

It will also be apparent to the skilled artisan that the scope of the present invention can also be applied to testing other types of input data besides the string and numeric tokens described herein. In that regard, the operation of the present invention can be applied to any case where the input data has any attribute that can vary over a range of sequential integral values. Examples can include numeric tokens, where the integral attribute is the value of the token, or arrays or lists of objects, where the integral attribute is the number of such objects.

Further, the invention can be used in any case where the integral value is an attribute of the behavior of the testing process. Some examples include iterative testing of a module, where the integral attribute is the number of tests or test cycles performed; time dependencies, where the integral attribute is related to the time interval between testing operations, such as the time delay between operations in a test script, or the frequency of testing operations, such as the number of operations performed per unit of time; and performance dependencies, such as the number of tests being performed simultaneously.

Yet further, the invention can be used in any case where the integral value is an attribute of the testing environment, or of the target module itself. Some examples include resource constraints, such as memory or disk space allocated for the target module, where the integral attribute represents the extent of such resource; and constraints upon the activity of the target module, such as the total number of requests which the target module will allow, or the maximum number of simultaneous requests the target module will allow.

Figure 5:
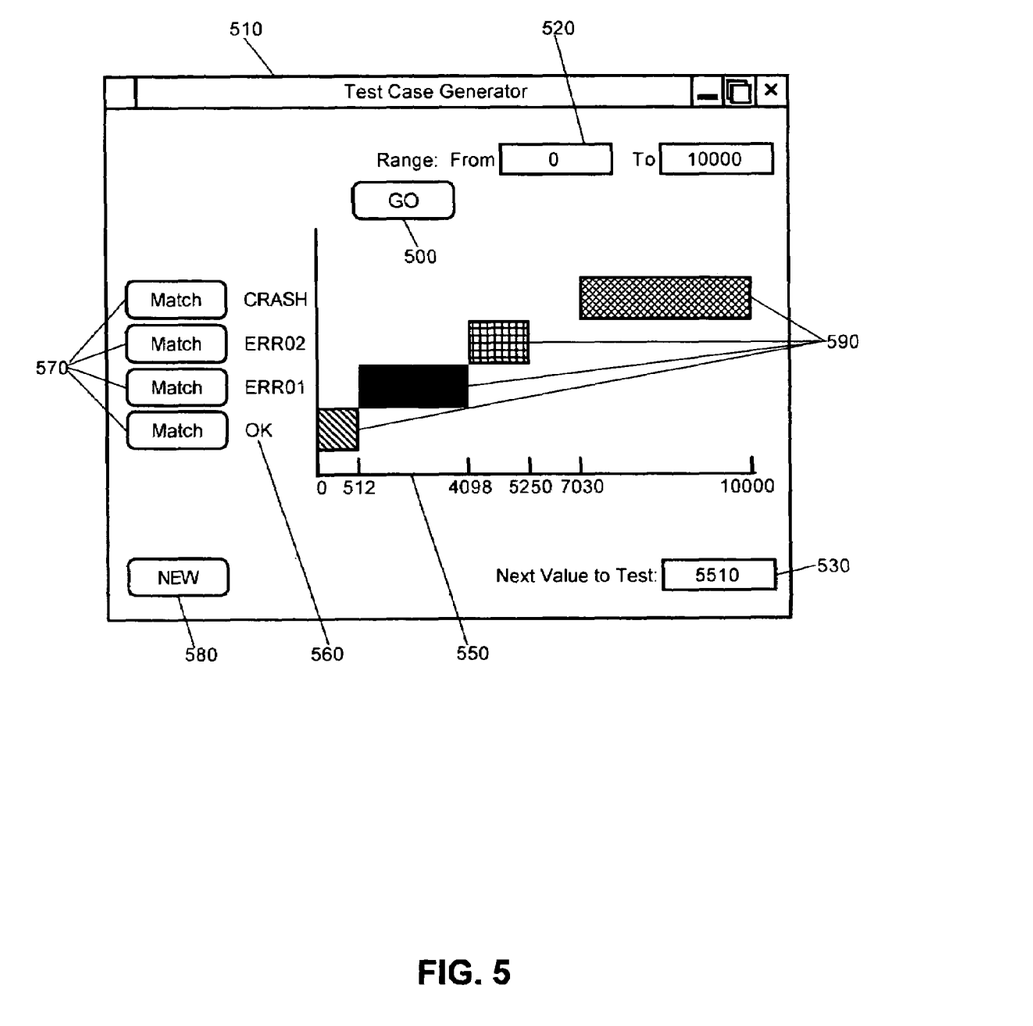
FIG. 5 is a pictorial illustration of an exemplary user interface for manually operating the software testing system of FIG. 2; and, FIG. 6 is a pictorial illustration of an exemplary user interface for automatically operating the software testing system of FIG. 2.
Figure 6:
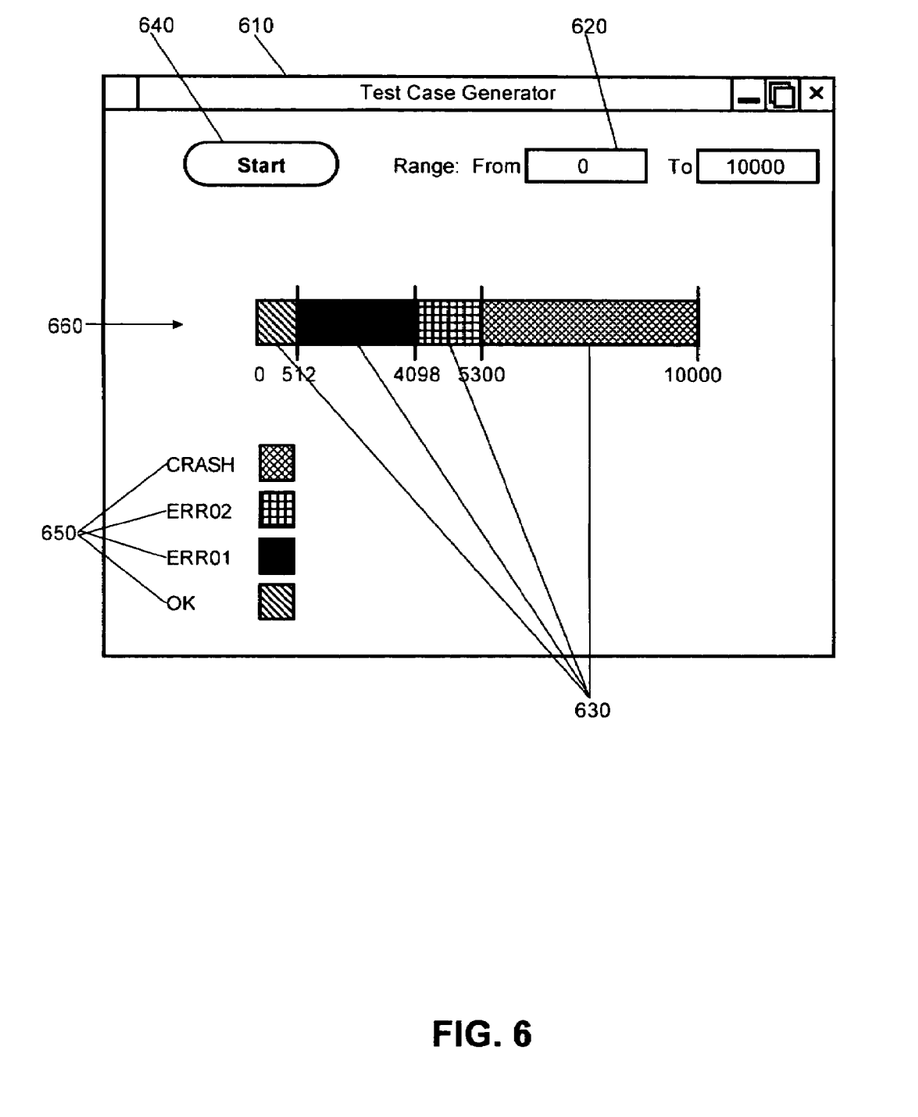

In any case, as it will be apparent from the illustration of FIG. 1, a set of user interfaces can be provided such that the foregoing process can be controlled either manually or automatically. FIGS. 5 and 6 each illustrate one aspect of a preferred user interface arrangement. In particular, FIG. 5 is a pictorial illustration of a user interface 510 configured for the manual operation of the test case generator of FIG. 1 in accordance with the present invention. In this mode, the test case generator is responsible only for calculating test case values based on the halving process described earlier; the user is responsible for actually testing those values against the software under test and interpreting the results. Referring to FIG. 5, the user interface 510 can include input fields 520 through which a range of test values can be specified by the end user. The range can be specified in terms of maximum and minimum integer values that define the overall test range in addition to a user interface element 500 configured to initiate the testing process.

A graphical chart 550 can be rendered in the user interface 510 with different sub-range plots 590 disposed therein. As shown in the exemplary graphical chart 550, one axis can represent the test case values extending through the user specified range, while another axis of the chart 550 can represent the result states when the test case values have been applied to the software under test. Importantly, as new test cases are evaluated, the sub-range plots 590 can expand or contract and new sub-range plots 590 can be created based upon the result states produced by the application of the test case values to the software under test.

The next value to be tested as calculated by the inventive arrangements described earlier can be presented in the next value field 530. After the end user has actually tested this value against the software under test and observed a result, the end user can determine whether the result is to be considered as equivalent to a previously defined state 560, or whether a new state is to be defined for the result. Where the result is equivalent to a previously defined state 560, a corresponding matching element 570 can be activated to indicate a match between the result and the previously defined state 560 associated with the activated matching element 570. As a consequence of this action one or more of the sub-range plots 590 may grow or shrink to accommodate the matching value. If the result is not equivalent to a previously defined state 560, the new element 580 can be activated to indicate the detection of a new state.

Responsive to the activation of the new element 580, a dialog can be presented to the end user (not shown) through which the end user can define the new state in terms of a label, and through which the end user can provide additional information regarding the new state. Once the new state has been defined, the label for the new state can be added to the list of known states 560 along with a corresponding matching element 570 and a new sub-range plot 590. Subsequently, the process can continue by the automatic calculation of a new test case value and the display of that value in the next value field 530. The entire process continues iteratively until the test case generator determines that there are no more values to be tested in accordance with the inventive arrangements described earlier, at which point a dialog box or other indication is given to the user that the test process is complete.

The skilled artisan will recognize that the pictorial illustration of FIG. 5 represents merely an exemplary embodiment and the invention is not limited to the precise arrangement of visual elements depicted therein. Rather, other arrangements are contemplated to fall within the scope of the present invention. For instance other arrangements can include the additional rendering of information regarding the testing session, such as elapsed time, the number of test cases executed, the number of result sub-ranges found, the number and severity of problems encountered, and the number of times that the software under test has been tested; and attributes about the software under test, such as version or build number.

Aside from the manual operation of the test case generator 130 of FIG. 1, the test case generator 130 further can be operated in a fully automatic mode. In this mode it is assumed that the test case generator is capable of automatically causing test cases to be executed against the software under test, and the test case generator is also capable of interpreting the results of test cases for equivalence. Therefore, the only responsibility of the end user is to specify the initial test range. In this regard, FIG. 6 is a pictorial illustration of an exemplary user interface for automatically operating the software testing system of FIG. 2. Like the manual mode user interface 510 of FIG. 5, the user interface 610 can include input fields 620 through which a range of test values can be specified by the end user. The range can be specified in terms of maximum and minimum integer values that define the overall test range in addition to a user interface element 640 configured to initiate the testing process.

A graphical chart 660 can be rendered in the user interface 610 with different sub-range plots 630 disposed therein. As in the case of the manual mode user interface 510 of FIG. 5, the graphical chart 660 can include a multi-axis chart, wherein at least one axis can represent the test case values extending through the user specified range, while another axis can represent the result states when the test case values have been applied to the software under test. Preferably, as shown in FIG. 6, an alternative stacked bar graph can be provided in which the individual sub-range plots 630 can be stacked, either horizontally or vertically. As before, as new test cases are evaluated, the sub-range plots 630 can expand or contract and new sub-range plots 630 can be created based upon the result states produced by the application of the test case values to the software under test.

It will be apparent to the skilled artisan that it can also be possible to operate the test case generator in a mode intermediate between automatic and manual. For example, the test case generator may be capable of automatically executing test cases against the software under test, but not capable of interpreting the results. In the case of such a semiautomatic operation mode, a user interface that combines elements of both FIGS. 5 and 6 may be appropriate.

It will be apparent to the skilled artisan that the scope of the present invention should not be limited merely to testing Internet systems. Rather, the present invention can test any target system which is responsive to an implementation of the invention. Moreover, it will be further apparent to the skilled artisan that the scope of the invention is not limited to testing target systems realized in software. Target systems could also be realized in hardware or any combination of hardware and software.

In that regard, the present invention can be realized in hardware, software; or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer usable medium embodying computer usable program code for a software testing tool, said software testing tool comprising a user interface coupled to a test case generator configured for range bounding for a range of integral values of token lengths for input data to discover a minimal set of range boundaries triggering response states in a software application under test.

2. The software testing tool of claim 1, wherein said user interface comprises at least one of an automatic and manual mode oriented user interface, each configured to accept a specification of a range of integral values to be tested, and further configured to render results of said range bounding in graphical form.

3. The software testing tool of claim 2, wherein said graphical form comprises at least one of a stacked bar chart and a multi-axis chart.

4. The software testing tool of claim 2, wherein said graphical form comprises a plurality of dynamically changeable graphical renderings of sub-ranges for each state produced by said range bounding.

5. The software testing tool of claim 4, wherein said graphical form further comprises:

an activatable element disposed within said graphical form for matching a result in a sub-range produced through said range bounding to an existing state rendered in said graphical form; and, a dialog for configuring and rendering a new state in said graphical form for a result in a sub-range produced through said range bounding.

6. The software testing tool of claim 1, further comprising an application programming interface (API) to said test case generator exposing methods for configuring individual test ranges of integral values, for executing said range bounding for said individual test ranges, and for reporting results of said range bounding.

7. The software testing tool of claim 1, further comprising an import/export facility configured both to export results from said range bounding in said test case generator to a portable format, and also to import into said test case generator persisted results from a previous instance of range bounding.

8. The software testing tool of claim 7, wherein said import/export facility further comprises a comparator programmed to compare results from said range bounding to persisted results from previous instances of range bounding.

9. The software testing tool of claim 7, further comprising conditional notification logic for notifying external entities of results from said range bounding.

10. The software testing tool of claim 1, wherein said test case generator comprises a halving module programmed to identify changes in response states in said software application under test evoked from input tokens having selected ones of the lengths defined within sub-ranges of a specified range of integral values.

11. The software testing tool of claim 2, wherein said test case generator comprises a halving module programmed to identify changes in response states in said software application under test evoked from input tokens having selected ones of the lengths defined within sub-ranges of a specified range of integral values.

12. The software testing tool of claim 6, wherein said test case generator comprises a halving module programmed to identify changes in response states in said software application under test evoked from input tokens having selected ones of the lengths defined within sub-ranges of a specified range of integral values.

13. The software testing tool of claim 7, wherein said test case generator comprises a halving module programmed to identify changes in response states in said software application under test evoked from input tokens having selected ones of the lengths defined within sub-ranges of a specified range of integral values.

* * * * *